United States Patent [19]

Kaczmarczyk et al.

[11] Patent Number: 5,542,339

[45] Date of Patent: Aug. 6, 1996

[54] TUBE CLAMP FOR BUNDLING A SET OF TUBES FOR SHIPMENT AND FOR MOUNTING THEM TO A LOADER BOOM

[75] Inventors: Edward T. Kaczmarczyk; Daniel R. Fuzzen, both of Welland; Paul G. Aucoin, Waterford; Lyle V. Norris, Vanessa, all of Canada

[73] Assignee: Deere & Company, Moline, Ill.

[21] Appl. No.: 427,924

[22] Filed: Apr. 26, 1995

[51] Int. Cl.⁶ .................................. F15B 11/00; F16L 3/00
[52] U.S. Cl. .......................... 91/508; 138/106; 248/68.1; 248/74.2
[58] Field of Search ................... 60/325, 420, 484; 91/508; 138/112, 113, 106; 285/137.1; 248/68.1, 74.2

[56] References Cited

U.S. PATENT DOCUMENTS

| | | | |
|---|---|---|---|
| 1,795,884 | 3/1931 | Parker | 138/112 X |
| 1,804,478 | 5/1931 | Parker | 138/113 |
| 3,682,422 | 8/1972 | Evans | 248/68.1 |
| 4,034,874 | 7/1977 | Collins | 248/68.1 X |
| 4,244,542 | 1/1981 | Matthews | 138/112 X |
| 4,304,077 | 12/1981 | Muller | 248/68.1 X |
| 4,572,302 | 2/1986 | Frisbee | 248/68.1 X |
| 4,658,854 | 4/1987 | Hopkins et al. | |
| 4,834,825 | 5/1989 | Adams et al. | 138/112 X |
| 4,899,964 | 2/1990 | Sick | 248/68.1 |
| 5,002,243 | 3/1991 | Kraus et al. | 298/74.2 X |

OTHER PUBLICATIONS

John Deere Welland Works 80 Loader Parts Catalog, PC–2251 (07–Jul.–88), pp. C–14 and C–15, printed in U.S.A.

Primary Examiner—Edward K. Look
Assistant Examiner—Hoang Nguyen

[57] ABSTRACT

A tube clamp includes a cylindrical resilient plastic body containing an axial mounting hole and having four tube receptacles arranged with a first pair on one side of the axis and with a second pair being respectively located in diametrically opposite locations from the first pair. Each receptacle includes an entryway leading to a tube-receiving portion defined by a cylindrical wall sized for snugly receiving a given tube and into which the tube may be snap-fit and retained without the use of fasteners. When shipping a tube bundle for use on equipment provided with hydraulic cylinders, as many clamps are used along the length of the bundle as are necessary to keep the tubes separated one from another, these same clamps being used to mount the clamps to structure of the equipment by inserting mounting bolts through the clamp mounting holes.

14 Claims, 2 Drawing Sheets

TUBE CLAMP FOR BUNDLING A SET OF TUBES FOR SHIPMENT AND FOR MOUNTING THEM TO A LOADER BOOM

BACKGROUND OF THE INVENTION

The present invention relates to the shipping and mounting of a set of metal or otherwise rigid hydraulic tubes used on equipment for routing fluid to and from hydraulic functions and, more specifically, relates to clamps used for bundling said tubes so as to keep the tubes separate one from the other during shipment and when mounted on the equipment for which the set was made.

An example of equipment using a set of hydraulic tubes for routing fluid to and from hydraulic functions is a tractor-mounted front-end loader. Typically, such a loader includes a vertically swingable boom comprising a pair of arms respectively to which are coupled a pair of lift cylinders. A bucket or other implement is mounted to the front end of the boom for being pivoted by a pair of tilt cylinders. A known tube arrangement includes first pair of supply/return tube assemblies for the lift cylinders and a second pair of supply/return tube assemblies for the lift cylinders.

Beginning at the rear end of one of the boom arms, both pairs of the tube assemblies first extend forwardly along the inside one of the boom arms to a cross member joining the boom arms and then extend along the cross member to a point adjacent the other boom arm where the second pair of tube assemblies terminates and the first pair of tube assemblies extends rearwardly along the inside of the other boom arm for a short distance. Provided for keeping the tubes of the first and second tube assemblies separated one from the other and for mounting the tube assemblies to the boom arms are three identical clamp assemblies, each including identical halves formed from a substantially square plate having a hole through the center thereof and having a parallel pair of semi-cylindrical recesses formed therein. Specifically, first and second ones of the three clamp assemblies are disposed in transverse alignment with each other, with the halves each being respectively engaged with opposite sides of respective tube portions adjacent first ends of the first and second pairs of tube assemblies and being received on a threaded stud welded to the inside of and adjacent the rear end of the one boom arm. A nut is received on the stud and holds the clamp halves tightly in place on the tube assemblies. The halves of the third clamp assembly are respectively engaged with tube portions adjacent a second end of the first tube assembly and are received on a second threaded stud welded to the inside of the other boom arm at a location spaced a short distance rearwardly of the cross member.

Those who make tube assemblies for loader manufacturers cut tube sections to a desired length, bend the sections where required and put fittings where required for connecting tube sections each other and/or to hydraulic hoses leading to the lift and tilt cylinders. These sets of tube assemblies are bundled into kits for shipment to the manufacturer of the loaders for which the sets of tubing were made. So that the tubing of such assemblies is not damaged during shipment, it has been the practice of one such tubing supplier to separate the tubes one from another by using clamps, like those of described in the immediately preceding paragraph. In fact, for shipping the tube assemblies described in the immediately preceding paragraph, this tubing supplier provides five clamp assemblies with some clamp halves being held together on the tube assemblies with a screw and nut assembly and other clamp halves being held together on the tube assemblies with a plastic tie strap. Thus, the maker of the tube assemblies has to maintain an inventory of ten clamp halves and fastening hardware and plastic tie straps for each set of tube assemblies. Further, the loader manufacturer ends up with two more clamp assemblies than is necessary for the mounting the tubing assemblies to the loader being built.

This means that not only does labor have to be expended removing the tie strap and extra clamp assemblies from the bundled tube assemblies, but requires disposal of the extra clamp assemblies and tie strap. Thus, the extra clamp assemblies and tie strap add cost both direct and indirect costs in labor and material to the manufacture of the loader.

SUMMARY OF THE INVENTION

According to the present invention, there is provided a novel clamp assembly for use both in shipping bundled tube assemblies and in mounting the assemblies to equipment that use the assemblies as conduits for routing hydraulic fluid to and from hydraulic functions of the equipment.

A broad object of the invention is to provide tube bundling clamps which are usable also as clamps for mounting tubing assemblies to equipment, with each clamp being capable of effecting its clamping function without the use of fasteners or plastic ties.

Yet another object of the invention is to provide a tube bundling arrangement wherein all of the clamps required for shipping tube assemblies for use on a piece of equipment are also used for mounting the assemblies to the equipment.

A more specific object of the invention is to provide tube clamps which are each constructed of a body of yieldable resilient material, such as plastic, having receptacles therein into which rigid tubes may be snap-fit.

Yet a more specific object is to provide a clamp of the type described in the immediately preceding object wherein the body of material is cylindrical and is provided with diametrically opposite pairs of receptacles extending crosswise to the direction to the longitudinal axis of the body.

These and other objects of the invention will become apparent from a reading of the following description together with the appended drawings.

DESCRIPTION OF THE PREFERRED EMBODIMENT

Figure 1:
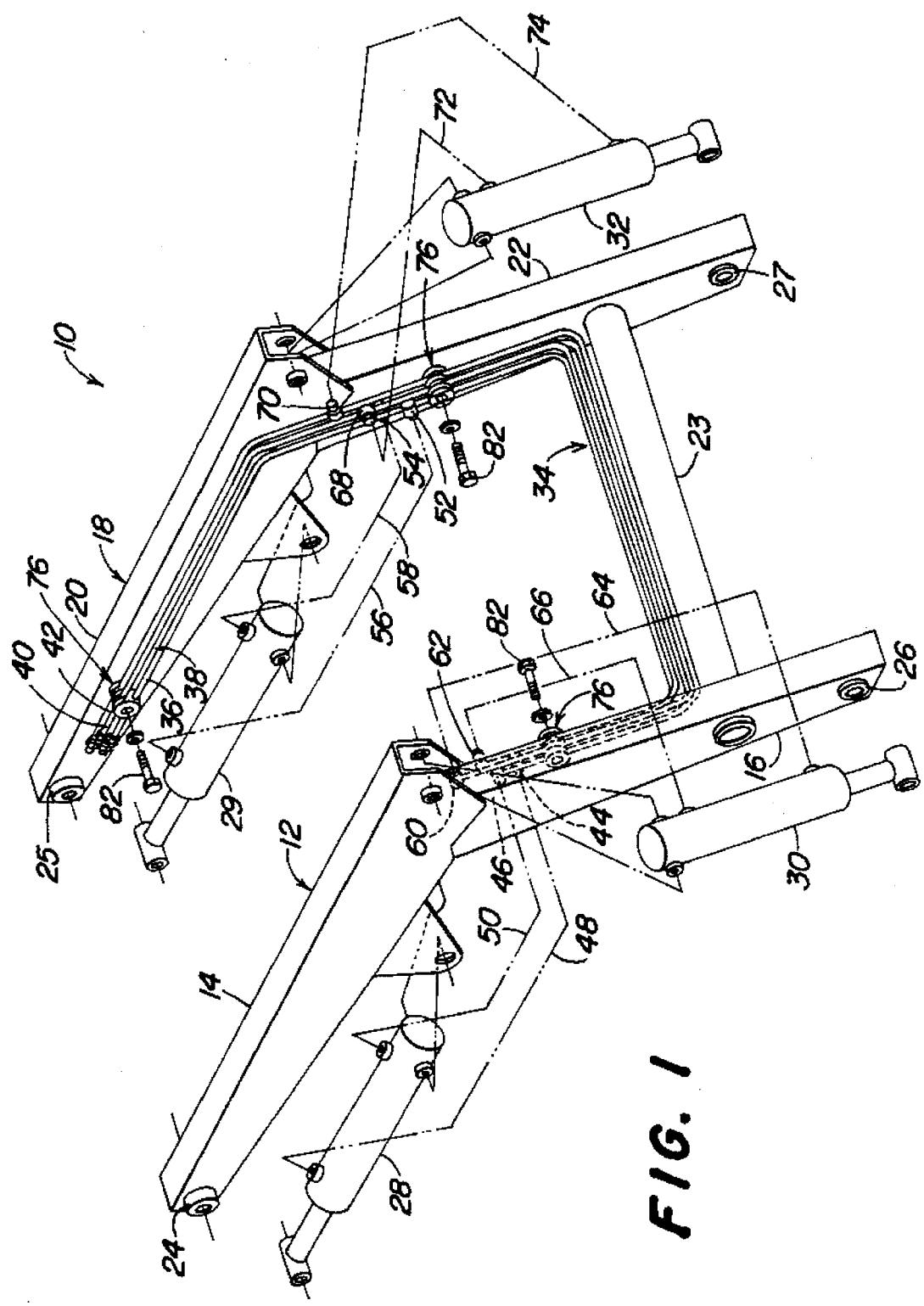
FIG. 1 is a partially schematic, right front perspective view showing a set of tube assemblies and the clamps mounting the assemblies to the boom arms of a front-end loader.

Referring now to FIG. 1, there is shown a portion of a piece of equipment which exemplifies equipment that incorporate a plurality of hydraulic cylinders for manipulating various parts of the equipment and to which is mounted hydraulic fluid conduits serving to route fluid to and from the cylinders. Specifically, shown is a front-end loader boom 10 defined by a right-hand arm 12 including rear and front arm sections 14 and 16, respectively, and a left-hand arm 18 including rear and front arm sections 20 and 22. The front arm sections 16 and 22 are respectively joined to the forward ends of and angled downwardly and forwardly from the rear arm sections 14 and 20. The arms 12 and 18 are joined together by a horizontal transverse cross member 23 located adjacent forward ends of the front arm sections 16 and 22. The boom 10 forms part of a known loader construction in which respective bushings 24 and 25 at the rear ends of the arms 12 and 18 would receive pins (not shown) mounting the boom for swinging about a first horizontal transverse axis defined by the pins and coupling the boom to upper ends of a pair of upright masts or posts (not shown) located at opposite sides of and forming part of a support frame mounted to a tractor (not shown), and in which respective bushings 26 and 27 in the forward ends of the arms would be mounted to a bucket or other implement (not shown) by coupling pins defining a second horizontal transverse axis about which the bucket or other implement is tiltable.

Provided for raising and lowering the boom 10 about the first horizontal transverse axis are right- and left-hand, two-way lift cylinders 28 and 29, respectively, having head ends respectively connected to the rear arm sections 14 and 20, and having rod ends adapted for being coupled to an adjacent one of the unshown upright masts or posts. Provided for selectively tilting the unshown bucket or other implement in opposite directions about the second horizontal transverse pivot axis are right- and left-hand tilt cylinders 30 and 32, respectively, having head ends connected to the front of front arm sections 14 and 20 and having rod ends adapted for being coupled to what ever implement is tiltably secured to the forward ends of the arms.

A tube arrangement 34 includes a first pair or set of pressure/return tube assemblies 36 and 38, to which the lift cylinders 28 and 29 are coupled in parallel with each other, and a second pair or set of pressure/return tube assemblies 40 and 42, to which the tilt cylinders 30 and 32 are coupled in parallel with each other. Specifically, the first pair of tube assemblies 36 and 38 are sized, positioned and shaped such that, starting at location adjacent the rear end of the left-hand arm 18, they first extend forwardly along the inside of the rear arm section 20, then downwardly and forwardly along the front arm section 22, then transversely across the cross member 23, and finally upwardly and rearwardly along and to a location adjacent the upper end of the right-hand front arm section 16 where they terminate at ninety-degree fittings 44 and 46 that are coupled to respective ports at opposite ends of the right-hand lift cylinder 28 by flexible hoses indicated schematically at 48 and 50. Incorporated in the tube assemblies 36 and 38, at a location adjacent the upper end of the left-hand front arm section 22, are respective T-fittings 52 and 54 that are coupled to opposite ends of the left-hand lift cylinder 29 by respective hoses indicated schematically at 56 and 58. The second pair of tube assemblies 40 and 42 are arranged in parallel relationship to the first pair of tube assemblies 36 and 38 and respectively terminate at ninety-degree fittings 60 and 62 adjacent the upper end of the right-hand front arm section 16, with flexible hoses, shown schematically at 64 and 66, respectively, being coupled between the fittings 60 and 62 and ports at opposite ends of the right-hand tilt cylinder 30. T-fittings 68 and 70, respectively, incorporated in the pair of tube assemblies 40 and 42 in the vicinity of the T-fittings 52 and 54 are coupled to ports at opposite ends of the left-hand tilt cylinder 32 by a pair of flexible hoses, shown schematically at 72 and 74.

Three identical tube clamps 76, one being located adjacent the rear of the left-hand rear boom arm section 20 and one being respectively located about half-way between the ends of the left-hand front boom arm section 22, and the other one being located about half-way between the ends of the right-hand front boom arm section 16, are provided for holding the tube assemblies 36, 38, 40 and 42 in spaced relationship to each other and for mounting the tube assemblies to the loader boom 10. For reasons which are described below, the clamps 76 are constructed of a hard, synthetic plastic material such as nylon which has a certain degree of flexibility and resiliency.

Figure 3:
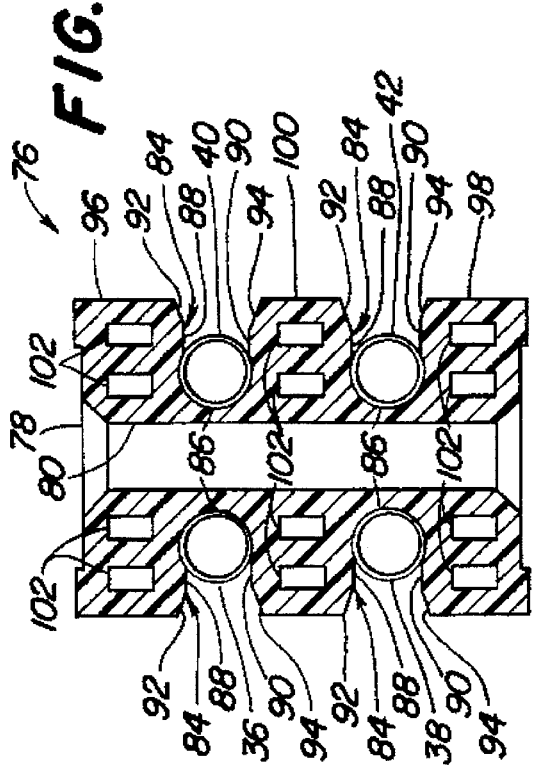
FIG. 3 is a longitudinal sectional view of the tube clamp taken along line 3—3 of FIG. 2.
Figure 4:
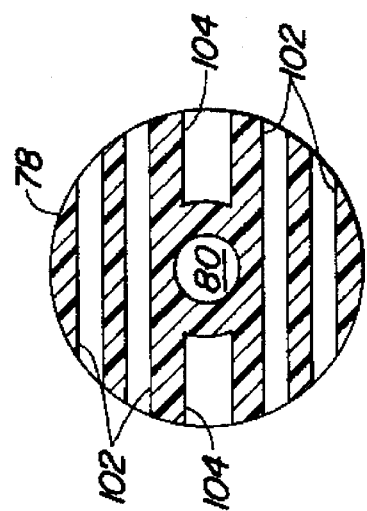
FIG. 4 is a transverse sectional view of the tube clamp taken along line 4—4 of FIG. 2.
Figure 2:
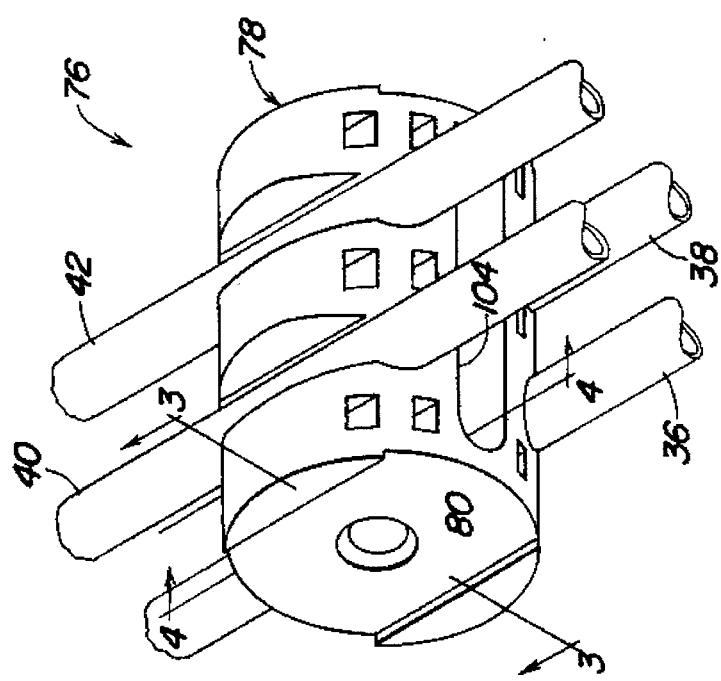
FIG. 2 is a perspective view of one of the tube clamps shown in FIG. 1.

Referring now also to FIGS. 2–4, it can be seen that each clamp 76 comprises a cylindrical body 78 having a bore 80 extending axially therethrough. Each of the three clamps 76 is respectively mounted in its above-described desired location on the boom 10 by a bolt 82 located in the bore 80 and having a threaded end received in a nut (not shown) welded on the inside surface of the boom arms 12 and 18 at the respective desired location. Formed in the clamp body 78 are four identical tube receptacles 84, each of which is defined by an inner cylindrical surface portion 86, having a cross-section extending through an angle slightly in excess of 180°, and being formed about an axis extending crosswise to the direction of, and being spaced an equal distance radially outwardly from, the longitudinal axis of the body 78. The diameter of the cylindrical surface portion 86 is such that the portion 86 will snugly receive a tube intended to be clamped by the clamp 76. The four receptacles 84 are arranged such that a first pair are spaced from each other on one side of the longitudinal axis of the body 78 while a second pair are respectively disposed at diametrical opposite locations from the first pair. Leading into the cylindrical surface portion 86 of each receptacle 84 is an entry or mouth defined by parallel planar surfaces 88 and 90 which are spaced apart by a distance somewhat less than the diameter of the cylindrical portion 86 and, hence, somewhat less than the diameter of the hydraulic tube intended to be clamped by the clamp 76. Relative to the longitudinal axis of the body 78, the planar surfaces 88 and 90 respectively terminate outwardly at outwardly diverging guide surfaces 92 and 94. The weight of the body 78 is reduced and the axial flexibility of opposite end and central portions 96, 98 and 100, respectively, bounding the receptacles 84 is enhanced by providing each of said portions 96, 98, 100 with four holes 102 of rectangular cross section disposed in parallel relationship to the axes of the cylindrical receptacle portions 86 and arranged two on each side of the longitudinal axis of the body 78. Further weight reduction and enhanced flexibility is provided by diametrically opposite pockets 104 of oval cross section, elongated in the direction of the longitudinal axis of the body 78 and located between the oppositely opening pairs of receptacles 84. The enhanced flexibility makes it easier for steel tubes to be mounted to the clamp 76 since pressure applied to a given tube when placed against the guide surfaces 92 and 94 of a given receptacle 84 will result in the contacted members 96 and 100, or 98 and 100 flexing apart a distance sufficient for permitting the tube to be forced into the cylindrical receptacle portion 86 of the given receptacle. Once the tube enters the receptacle portion 86, the members 96 and 100, or 98 and 100 will return toward their unflexed condition to thereby establish a clamping force on the tube. Thus, a snap-fit is established between a given tube and clamp making clamping hardware unnecessary.

Referring again to FIG. 1, it can be seen that the clamps 76, respectively located near the rear end of the left-hand arm 18, about mid-way between the opposite ends of the left-hand front arm section 20 and about mid-way between the opposite ends of the right-hand front arm section 16, each have the first set of tube assemblies 36 and 38 received in the pair of the receptacles 84 at one side of its longitudinal axis and each have the second set of tube assemblies 40 and 42 received in the pair of receptacles 84 at the other side of its longitudinal axis.

It is here noted that an assembler or manufacturer of the tube arrangement 34 would normally bundle the arrangement for shipment by placing the two sets of tube assemblies 36–38 and 40–42 in clamps 76 positioned on the tube arrangement 34 at locations similar to those shown in FIG. 1. Thus, the tube assemblies 38, 40, 42 and 44 would be held in spaced relationship one from another during shipment so as to prevent damage that might result from the tubes rubbing on one another. Again, the clamping action of the clamps 76 on the various tubes would be effected without the use of any clamp screws or other hardware.

We claim:

1. A tube clamp for holding at least two rigid tubes in spaced relationship relative to one another comprising: a clamp body constructed entirely of a hard elastic material; a mounting hole located along an axis extending through the clamp body; at least two tube receptacles being provided in said clamp body in an orientation opening transversely outwardly relative to said axis; each tube receptacle including, relative to said axis, an inwardmost cylindrical portion extending crosswise to said axis, having a cross-section extending in excess of 180° about said axis, and being sized and shaped for snugly receiving a given tube and an entryway leading to said inwardmost portion defined by a pair of entryway surfaces spaced apart by a distance less than a diameter of said given tube; and said body being of a construction permitting said pair of entryway surfaces to be resiliently separated one from another so as to permit said given tube to be forced therebetween and into said inwardmost cylindrical portion of said tube receptacle, whereby, once said given tube is in place in said cylindrical portion, said entryway surfaces return to original positions clamping said given tube in place without the use of additional structure of any sort.

2. The tube clamp as defined in claim 1 wherein said pair of entryway surfaces are planar and parallel to each other.

3. The tube clamp as defined in claim 2 wherein said pair of entryway surfaces are an inner pair of surfaces; and an outer pair of outwardly diverging planar surfaces being respectively joined to outer ends of said pair of parallel planar surfaces.

4. The tube clamp as defined in claim 1 wherein said body is cylindrical and said mounting hole being located along a longitudinal axis of said body.

5. The tube clamp as defined in claim 1 wherein said body is constructed of a plastic material.

6. The tube clamp defined in claim 1 wherein, in addition to said at least two tube receptacles, at least two more tube receptacles are provided to make a total of at least four tube receptacles in said body; said at least four tube receptacles being arranged so that a first two open in a first direction away from said axis and so that a second two open in a direction opposite to said first direction; and said tube receptacles all being freely accessible.

7. The tube clamp defined in claim 6 wherein said body is cylindrical with said first two and second two receptacles being respectively located at diametrically opposite locations of said body.

8. The tube clamp defined in claim 7 wherein at least one hole extends through the block in parallel relationship to and between said first two receptacles and at least one other hole extends through the block in parallel relationship to and between said second two receptacles to thereby enhance the flexibility of a middle section of said body.

9. The tube clamp defined in claim 8 and further including a pair of diametrically opposite pockets elongated in the direction of said axis and being located in said block between the first and second two receptacles to thereby further enhance the flexibility of said middle section of said body.

10. In a piece of equipment including at least one, two-way hydraulic cylinder having a pair of supply/return ports to which a pair of supply/return hydraulic fluid conduits, including a pair of rigid tubes, are connected and including a support member to which said pair of fluid conduits are mounted by at least one clamp and a screw fastener located in a hole extending through said clamp and securing said clamp to said support member, the improvement comprising: said clamp being formed exclusively of a unitary body constructed of rigid, resilient material; a pair of tube receptacles being formed in said body; each tube receptacle including, relative to a peripheral surface of said body, an inner-most tube-receiving portion defined by a surface extending cylindrically through an angle in excess of 180° about an axis extending centrally through said tube-receiving portion and tightly embracing a respective one of said pair of rigid tubes and freely accessible entryway leading to said tube-receiving portion; and said entryway including a first pair of surfaces spaced apart a distance less than a diameter of said respective one of said pair of rigid tubes and having inner ends respectively joined to opposite ends of said cylindrically extending surface; and said first pair of surfaces of said entryway and opposite ends of said cylindrical surface being resiliently separable for permitting said respective one of said pair of rigid tubes to be removed from an associated one of said pair of tube receptacles.

11. The piece of equipment defined in claim 10 wherein said entryway further includes a second pair of surfaces respectively joined to and diverging outwardly from said first pair of surfaces.

12. In a front-end loader boom including parallel fore-and-aft extending first and second arms connected together by a cross member located forwardly from respective rear ends of the arms, a first pair of tubes serving as supply/return conduits for a pair of hydraulic lift cylinders respectively mounted to first locations on said first and second arms, a second pair of tubes serving as supply/return conduits for a pair of hydraulic tilt cylinders respectively mounted to second locations on said first and second arms, the first and second pairs of tubes extending forwardly along an inside surface of the first arm from a location adjacent the rear end thereof and then extending across the cross member and then rearwardly along an inside surface of the second arm, a plurality of clamps being mounted to said tubes and holding them separated one from another with each clamp including a mounting hole receiving a mounting bolt securing the clamp to one of said first and second arms, the improvement comprising: each clamp including a body of resilient plastic material; four tube receptacles being formed in said body and opening, at freely accessible surface locations of said body, in directions parallel to the respective inner wall of that one of the first and second arms to which the body is mounted; each receptacle including a first wall defining a tube-receiving portion having opposite ends and an entryway defined by second and third spaced apart walls extending between a respective one of said freely accessible surface locations of the body and being respectively joined to said first and second ends of said first wall defining said tube-receiving portion; a given tube of said first and second pairs of tubes being located in each receptacle; said first wall, as considered in a cross section extending vertically through said given tube, circumscribing over half of said given tube; and said tube-receiving portion being so dimensioned relative to said given tube that the latter is gripped and yieldably held in place solely by said first wall.

13. The front-end loader boom defined in claim 12 wherein said body is cylindrical and said mounting hole extends axially through said body.

14. The front-end loader boom defined in claim 13 wherein said four tube receptacles are located in first and second pairs respectively at diametrically opposite locations on opposite sides of said mounting hole; and said first pair of tubes being respectively located in said first pair of tube receptacles and said second pair of tubes being respectively received in said second pair of tube receptacles.

* * * * *